United States Patent
Tachibanada et al.

(10) Patent No.: US 11,209,080 B2
(45) Date of Patent: Dec. 28, 2021

(54) CONTROL DEVICE OF AUTOMATIC TRANSMISSION FOR VEHICLE

(71) Applicant: Honda Motor Co., Ltd., Tokyo (JP)

(72) Inventors: Yuya Tachibanada, Saitama (JP); Kazuma Sasahara, Saitama (JP); Makoto Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/148,585

(22) Filed: Jan. 14, 2021

(65) Prior Publication Data

US 2021/0215247 A1 Jul. 15, 2021

(30) Foreign Application Priority Data

Jan. 15, 2020 (JP) .............. JP2020-004366

(51) Int. Cl.
*F16H 3/62* (2006.01)
*F16H 61/02* (2006.01)
*F16H 61/00* (2006.01)
*F16H 59/68* (2006.01)
*F16H 59/44* (2006.01)

(52) U.S. Cl.
CPC ........... *F16H 61/0246* (2013.01); *F16H 3/62* (2013.01); *F16H 59/44* (2013.01); *F16H 59/68* (2013.01); *F16H 61/0025* (2013.01); *F16H 61/0204* (2013.01); *F16H 2059/6823* (2013.01); *F16H 2200/0069* (2013.01); *F16H 2200/2012* (2013.01); *F16H 2200/2048* (2013.01)

(58) Field of Classification Search
CPC .... F16H 61/0246; F16H 61/0204; F16H 3/62; F16H 61/0025; F16H 59/68; F16H 59/77; F16H 2059/6823; F16H 2200/2012; F16H 2200/2048
See application file for complete search history.

(56) References Cited

U.S. PATENT DOCUMENTS

2009/0045026 A1* 2/2009 Ishii .................. F16H 3/006
192/48.614

FOREIGN PATENT DOCUMENTS

JP 2014202340 10/2014
JP 2017089892 5/2017

OTHER PUBLICATIONS

"Office Action of Japan Counterpart Application" with English translation thereof, dated Oct. 5, 2021, p. 1-p. 8.

* cited by examiner

*Primary Examiner* — David J Hlavka
(74) *Attorney, Agent, or Firm* — JCIPRNET

(57) ABSTRACT

The disclosure provides a control device of an automatic transmission for vehicle, which can improve the responsiveness to switching to a reverse stage. The automatic transmission includes: planetary gear mechanisms which transmit the driving force input to an input shaft to an output member; and first to third clutches and first to fourth brakes as engagement mechanisms capable of establishing shift stages by switching a transmission path of the driving force in the planetary gear mechanisms. The control device executes a reverse preparation process for starting engagements of the first and third clutches and the third brake and stopping rotation of the input shaft when the reverse stage is selected when the fourth brake (mechanical engagement mechanism) is in a unidirectional rotation allowed state (first state) and the vehicle is traveling at a vehicle speed greater than a highest vehicle speed at which the reverse stage is establishable.

9 Claims, 9 Drawing Sheets

|  | C1 | C2 | C3 | B1 | B2 | B3 | F1 | Gear ratio |
|---|---|---|---|---|---|---|---|---|
| RVS |  |  | O |  | O |  | O | 4.008 |
| 1st |  |  |  | O | O |  | △/O | 5.233 |
| 2nd |  | O |  | O | O |  | (△) | 3.367 |
| 3rd |  |  | O | O | O |  | (△) | 2.298 |
| 4th |  | O | O | O |  |  | (△) | 1.705 |
| 5th | O |  | O | O |  |  | (△) | 1.363 |
| 6th | O | O | O |  |  |  | (△) | 1.000 |
| 7th | O |  | O |  | O |  | (△) | 0.786 |
| 8th | O | O |  |  | O |  | (△) | 0.657 |
| 9th | O |  |  |  | O | O | (△) | 0.584 |
| 10th | O | O |  |  |  | O | (△) | 0.520 |
| P/N |  |  |  |  |  |  | △/O | — |
| RPM | O |  | O |  | O |  | △ | — |

FIG. 2

| Planetary gear mechanism | Gear ratio |
|---|---|
| P1 | 2.681 |
| P2 | 1.914 |
| P3 | 1.614 |
| P4 | 2.734 |

FIG. 3

CONTROL DEVICE OF AUTOMATIC TRANSMISSION FOR VEHICLE

CROSS-REFERENCE TO RELATED APPLICATION

This application claims the priority benefit of Japan application serial no. 2020-004366, filed on Jan. 15, 2020. The entirety of the above-mentioned patent application is hereby incorporated by reference herein and made a part of this specification.

BACKGROUND

Technical Field

The disclosure relates to a control device of an automatic transmission for vehicle mounted on a vehicle.

Description of Related Art

For example, a power transmission device of a vehicle is provided with an automatic transmission which shifts the rotation input from a driving source such as an engine to an input shaft and which transmits the rotation to an output shaft. This automatic transmission generally includes a planetary gear mechanism and an engagement mechanism such as a clutch or a brake, and each shift stage is established by switching a power transmission path by the engagement mechanism.

Incidentally, a mechanical engagement mechanism in addition to a hydraulic pressure type is also adopted for the engagement mechanism such as the clutch or the brake provided in the automatic transmission, and it has also been proposed to use a two-way clutch as a brake which can be switched to a state that restricts bidirectional rotation as this mechanical engagement mechanism (see, for example, Patent Document 1).

As described above, when the two-way clutch is used as a brake, a rotation element connected to the two-way clutch can be switched between a state in which only unidirectional rotation is restricted and a state in which bidirectional rotation is restricted. When switching to the state in which bidirectional rotation is restricted, since the rotation element connected to the two-way clutch is fixed to the casing, if the state is switched while this rotation element is rotating, abnormal noise or vibration may be generated, and problems that may cause damage to the two-way clutch may occur. In order to eliminate such problems, it is conceivable to perform switching via a combination of engagements that make the rotation element stationary.

However, if it takes time to set the combination of the engagements for making the rotation element stationary, it may take time to switch the shift stages. Further, when the vehicle is stopped or when the vehicle speed is extremely low, since the rotation speed of each rotation element of the planetary gear mechanism is low, the abnormal noise and vibration generated when the two-way clutch is switched are small.

Therefore, Patent Document 2 has proposed a control device of an automatic transmission which suppresses generation of abnormal noise or vibration when switching a mechanical engagement mechanism such as a one-way clutch, and which shortens the switching time of the mechanical engagement mechanism when the generated abnormal noise or vibration is expected to be small.

RELATED ART

Patent Document

[Patent Document 1] Japanese Laid-open No. 2014-202340
[Patent Document 2] Japanese Laid-open No. 2017-089892

For example, when switching the shift stage to the reverse stage, it is necessary to switch the mechanical engagement mechanism from the unidirectional rotatable state to the bidirectional non-rotatable state (locked state). However, in the control device of the automatic transmission proposed in Patent Document 2, when the reverse stage (RVS) is selected as the shift position, the engagement of predetermined engagement mechanisms is started, and the rotation of the input shaft is stopped, and the switching preparation process (reverse preparation process) for fixing (locking) the mechanical engagement mechanism is performed.

However, in the control device proposed in Patent Document 2, even if the reverse stage (RVS) is selected at a high vehicle speed (for example, 15 km/h), since the reverse preparation process cannot be executed until the vehicle speed decreases to a value that allows switching to the reverse stage (after the reverse is confirmed), there is a problem that the responsiveness to switching to the reverse stage is poor.

The disclosure has been made in view of the above problems, and the disclosure provides a control device of an automatic transmission for vehicle, which can improve the responsiveness to switching to a reverse stage.

SUMMARY

In view of the above purposes, the disclosure provides a control device of an automatic transmission (1) for vehicle. The automatic transmission for vehicle includes: an input shaft (10) to which a driving force is input; an output member (11) which outputs a driving force; planetary gear mechanisms (P1 to P4) which transmit the driving force input to the input shaft (10) to the output member (11); and engagement mechanisms (C1 to C3, B1 to B3, F1) capable of establishing shift stages by switching a transmission path of the driving force in the planetary gear mechanisms (P1 to P4). One of engagement mechanisms (C1 to C3, B1 to B3, F1) is a mechanical engagement mechanism (F1) which is switchable between: a first state in which only rotation of a predetermined rotation element (Cr1, Cr2) in a first direction among rotation elements included in the planetary gear mechanisms (P1 to P4) is restricted; and a second state in which bidirectional rotation of the predetermined rotation element (Cr1, Cr2) in the first direction and in a second direction opposite to the first direction is restricted. The shift stages include: a lowest forward shift stage (1st) which is establishable when the mechanical engagement mechanism (F1) is in the first state or the second state; a forward shift stage (2nd to 10th) which has a gear ratio greater than that of the lowest forward shift stage (1st) and which is not establishable when the mechanical engagement mechanism (F1) is in the second state; and a reverse stage (RVS) which is establishable when the mechanical engagement mechanism (F1) is in the second state. A predetermined engagement mechanism (C1, C3, B3) is an engagement mechanism which restricts the rotation of the predetermined rotation element (Cr1, Cr2) in the second direction by engagement when the shift stage is the lowest forward shift stage (1st) and the mechanical engagement mechanism (F1) is in the first state. The control device includes: a vehicle speed sensor (114) which detects a vehicle speed; and a control part (100) which controls the engagement mechanisms (C1 to C3, B1 to B3, F1). The control part (100) includes a function of being capable of engaging the predetermined engagement mechanism (C1, C3, B3) when the shift stage is the lowest forward shift stage (1st) and the mechanical engagement mechanism (F1) is in the first state, and executes a reverse preparation process for starting an engagement of the predetermined engagement mechanism (C1, C3, B3) and stopping rotation of the input shaft (10) when the reverse stage (RVS) is selected when the mechanical engagement mechanism (F1) is in the first state and the vehicle is traveling at a vehicle speed greater than a highest vehicle speed at which the reverse stage (RVS) is establishable.

BRIEF DESCRIPTION OF THE DRAWINGS

FIG. 2 is a diagram showing an engagement table of the engagement mechanisms in the automatic transmission for vehicle.

FIG. 3 is a diagram showing the gear ratio of each planetary gear mechanism of the automatic transmission for vehicle.

DESCRIPTION OF THE EMBODIMENTS

Figure 1:
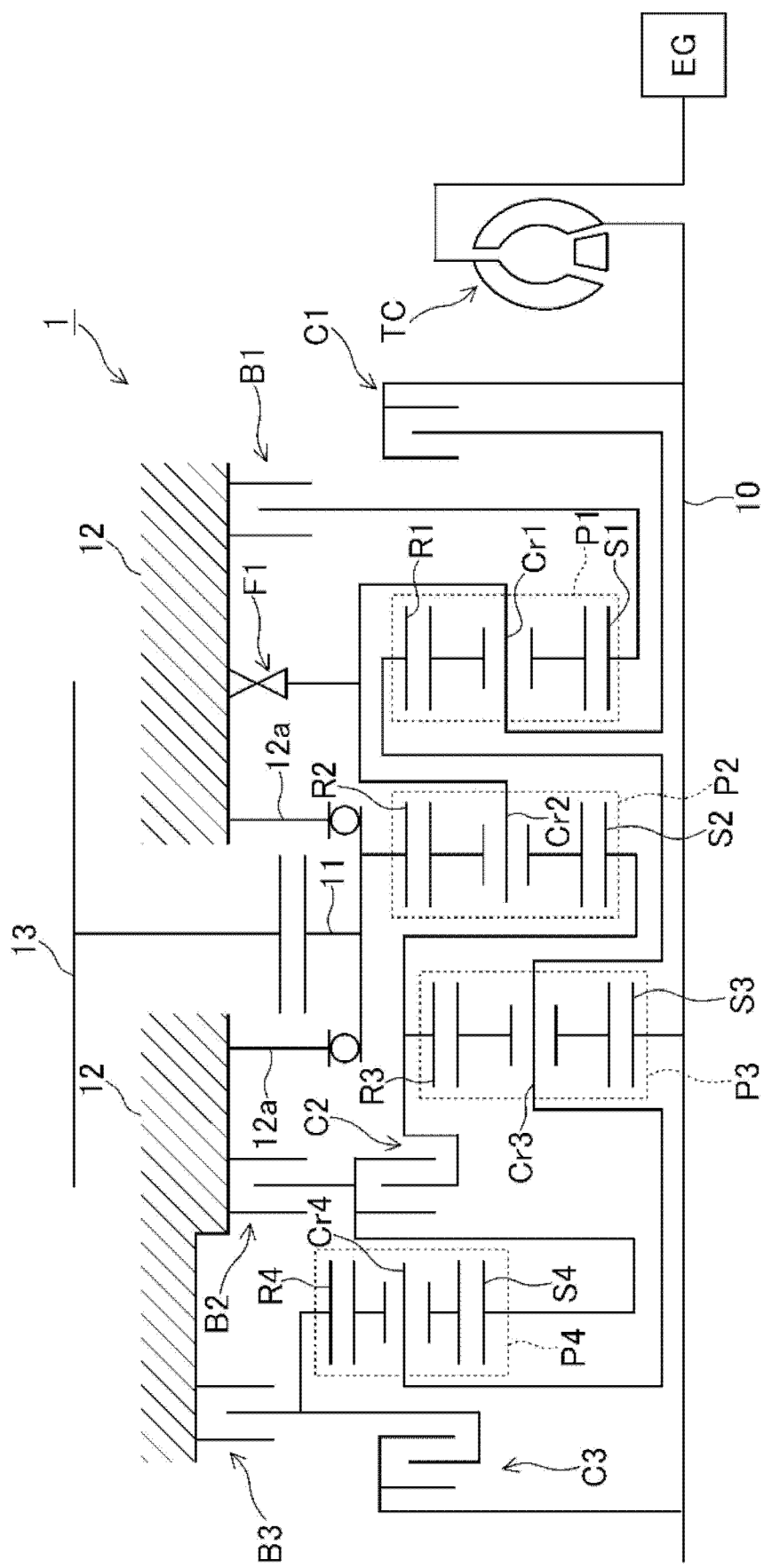
FIG. 1 is a skeleton diagram of a gear train showing a basic configuration of an automatic transmission for vehicle.

According to the disclosure, even when the vehicle is traveling at a high speed, when the reverse stage (RVS) is selected by the driver, the reverse preparation process for starting the engagement of the predetermined engagement mechanism and stopping the rotation of the input shaft is immediately executed. Therefore, it is not necessary to wait without executing the reverse preparation process until the vehicle speed decreases to the specified value (for example, 6 km/h) as in the conventional technique, and it is possible to improve the responsiveness to switching to the reverse stage of the automatic transmission for vehicle.

Here, the control device (100) may further include a shift position detection part (112) which detects a shift position, and the control part (100) may execute the reverse preparation process when the shift position detection part (112) detects neutral (N). In this case, the predetermined engagement mechanism (C1, C3, B3) may be a hydraulic engagement mechanism which engages by receiving a supply of hydraulic pressure, and the control part (100) may start supplying hydraulic pressure to the predetermined engagement mechanism (C1, C3, B3) when the shift position detection part (112) detects the neutral (N).

According to the above-mentioned configuration, for example, when the driver selects the reverse stage (RVS), since the shift position always passes through the neutral (N), the shift position detection part detects the neutral (N) and at the same time, the reverse preparation process can be executed.

Further, the control device (100) may further include a rotation speed detection part (111) which detects a rotation speed of the input shaft (10). When the reverse stage (RVS) is selected as the shift stage, the control part may switch the shift stage to the reverse stage (RVS) when the rotation speed of the input shaft (10) detected by the rotation speed detection part (111) is less than a specified value and the vehicle speed detected by the vehicle speed sensor (114) is less than or equal to a specified value after the reverse preparation process is executed. Here, the specified value of the rotation speed of the input shaft (10) is 0 or a small value close to 0, and the specified value of the vehicle speed is a vehicle speed at which the lowest forward shift stage (1st) is selected as the shift stage if the shift position is switched to drive (D).

According to the above-mentioned configuration, even if the reverse preparation process is completed, when the vehicle speed exceeds the specified value, the mechanical engagement mechanism is not switched to the second state side (lock side), and during this time, the mechanical engagement mechanism is maintained in the first state (unidirectional rotation allowed state). Therefore, even when the driver performs a shift operation to set the shift position to the drive (D) in this state, it is not necessary to switch the mechanical engagement mechanism to the first state (unidirectional rotation allowed state), and the shift stage can be easily set to the second speed stage (2nd) or higher.

According to the disclosure, it is possible to achieve an effect that the responsiveness to switching to the reverse stage of the automatic transmission for vehicle can be improved.

Hereinafter, embodiments of the disclosure will be described with reference to the accompanying drawings.

[Automatic Transmission for Vehicle]

<Basic Configuration of Automatic Transmission for Vehicle>

First, a basic configuration of an automatic transmission for vehicle (hereinafter simply referred to as the "automatic transmission") 1 including a control device according to the disclosure will be described below with reference to FIG. 1.

FIG. 1 is a skeleton diagram of a gear train showing a basic configuration of the automatic transmission 1, and the upper half of the axis of the automatic transmission 1 is shown in the figure.

The shown automatic transmission 1 includes an input shaft 10 rotatably supported in a casing 12 configuring a transmission case, and includes an output member 11 and an output shaft 13 rotatably disposed coaxially with the input shaft 10. Here, the output member 11 is rotatably supported by a support member 12a supported by the casing 12.

The driving force from an engine EG, which is a driving source, is input to the input shaft 10, and a torque converter TC is provided between the input shaft 10 and the engine EG as a fluid coupling type starting device. Therefore, the driving force from the engine EG is transmitted to the input shaft 10 via the torque converter TC, and the input shaft 10 is rotationally driven at a predetermined speed by this driving force.

Further, the output member 11 and the output shaft 13 each include a gear concentric with the input shaft 10, and when these gears mesh with each other, the rotation of the input shaft 10 is shifted by a transmission mechanism described below, and is transmitted to the output shaft 13 via the output member 11. Then, the rotation of the output shaft 13 is transmitted to the left and right axles (not shown) via, for example, a differential mechanism (not shown), and the driving wheels (not shown) attached to each axle are rotationally driven, whereby the vehicle travels at a predetermined speed.

In addition, the automatic transmission 1 includes four planetary gear mechanisms P1, P2, P3 and P4 as transmission mechanisms, and three clutches C1, C2 and C3, three brakes B1, B2 and B3 and a mechanical engagement mechanism F1 which are engagement mechanisms. Here, in the embodiment, all of the four planetary gear mechanisms P1 to P4 adopt a single pinion type, and the rotation of the input shaft 10 is shifted by these planetary gear mechanisms P1 to P4 and is transmitted to the output member 11. That is, the clutches C1 to C3, the brakes B1 to B3, and the mechanical engagement mechanism F1 configuring the engagement mechanisms switch the transmission path of the driving force in the planetary gear mechanisms P1 to P4 to establish multiple shift stages (in this embodiment, 10 forward stages and 1 reverse stage).

Here, the four planetary gear mechanisms P1 to P4 each include sun gears S1 to S4, ring gears R1 to R4, and carriers Cr1 to Cr4 which rotatably support pinion gears (planetary gears) that mesh with the sun gears S1 to S4 and the ring gears R1 to R4 as multiple (12 in total) rotation elements, and these are disposed coaxially with the input shaft 10.

When the sun gear S1, the carrier Cr1, and the ring gear R1 of the planetary gear mechanism P1 are arranged in the order of arrangement at intervals corresponding to the gear ratios in the collinear diagram (speed diagram) of FIG. 4 (to be described later), they can be referred to as "a first rotation element," a "second rotation element," and a "third rotation element" in this order. Similarly, the ring gear R2, the carrier Cr2, and the sun gear S2 of the planetary gear mechanism P2 can be referred to as a "fourth rotation element," a "fifth rotation element," and a "sixth rotation element" in this order, and the sun gear S3, the carrier Cr3, and the ring gear R3 of the gear mechanism P3 can be referred to as a "seventh rotation element," an "eighth rotation element," and a "ninth rotation element" in this order. Then, the ring gear R4, the carrier Cr4, and the sun gear S4 of the planetary gear mechanism P4 can be referred to as a "tenth rotation element," an "eleventh rotation element," and a "twelfth rotation element" in this order.

By the way, the three clutches C1 to C3 and the brakes B1 to B3 configuring the engagement mechanisms are switched to an engagement state (engaged state) or an engagement release state (open state), and the state of the mechanical engagement mechanism F1 is switched, whereby the power transmission path from the input shaft 10 to the output member 11 is switched, and multiple shift stages are established. In addition, in the embodiment, the clutches C1 to C3 and the brakes B1 to B3 both use hydraulic friction engagement mechanisms, and a dry or wet single-plate or multi-plate clutch or single-plate or multi-plate brake is used as the hydraulic friction engagement mechanisms.

Further, the mechanical engagement mechanism F1 is provided between predetermined rotation elements (the carriers Cr1 and Cr2 connected to each other in the embodiment) and the casing 12. This mechanical engagement mechanism F1 is switchable between a "unidirectional rotation allowed state" (one-way clutch (OWC) state) which restricts only unidirectional rotation of the predetermined rotation elements (the carriers Cr1 and Cr2) and which allows rotation in the opposite direction and a "rotation blocked state" (two-way clutch (TWC) state) which restricts bidirectional rotation.

Here, the above-mentioned "unidirectional rotation allowed state" is a state having the same function as the so-called one-way clutch (OWC), and is a state in which driving transmission is performed in one of the rotation directions and is idling in the other direction. In the embodiment, since the mechanical engagement mechanism F1 functions as a brake, the mechanical engagement mechanism F1 is hereinafter referred to as the "brake F1." When the brake F1 is in the "unidirectional rotation allowed state," only the unidirectional rotation of the predetermined rotation elements (carriers Cr1 and Cr2) is allowed.

Further, the above-mentioned "rotation blocked state" is a state in which driving transmission is performed in two directions in the rotation direction. In the embodiment, the brake F1 functions as a brake, and when the brake F1 is in the "rotation blocked state," the predetermined rotation elements (the carriers Cr1 and Cr2) are in a locked state in which bidirectional rotation is blocked.

For example, a known two-way clutch (TWC) can be adopted as the brake F1. Here, for a known two-way clutch, it is something switchable between a "unidirectional rotation allowed state," a "bidirectional rotation blocked state," or a "bidirectional rotation allowed state" by driving control of a hydraulic pressure actuator or an electromagnetic actuator. In addition, there are some that are further switchable between a "forward rotation allowed state" and a "reverse rotation allowed state" for the "unidirectional rotation allowed state." In the embodiment, it is sufficient to switch between the "unidirectional rotation allowed state" and the "bidirectional rotation blocked state," and it is sufficient that in the "unidirectional rotation allowed state," it is usable only in a state in which one rotation direction is allowed. However, a two-way clutch that can select another state such as a "bidirectional rotation allowed state" may be used.

<Connection Relationship Between Each Component>

Here, the connection relationship between each component in the automatic transmission 1 will be described with reference to FIG. 1.

The sun gear S3 of the planetary gear mechanism P3 is connected to the input shaft 10, and the carrier Cr3 is connected to the ring gear R1 of the planetary gear mechanism P1 and the carrier Cr4 of the planetary gear mechanism P4. Further, the carrier Cr2 of the planetary gear mechanism P2 is connected to the carrier Cr1 of the planetary gear mechanism P1, and the ring gear R2 is connected to the output member 11. Therefore, the planetary gear mechanism P2 functions to output a driving force to the output shaft 13.

The clutch C1 connects the input shaft 10 with the carrier Cr1 of the planetary gear mechanism P1 and the carrier Cr2 of the planetary gear mechanism P2 in the engagement state, and releases the connection of the carriers Cr1 and Cr2 in the open state. Further, the clutch C2 connects the ring gear R3 of the planetary gear mechanism P3 with the sun gear S4 of the planetary gear mechanism P4 in the engagement state, and releases the connection between the ring gear R3 and the sun gear S4 in the open state. Then, the clutch C3 connects the input shaft 10 with the ring gear R4 of the planetary gear mechanism P4 in the engagement state, and releases the connection between the input shaft 10 and the ring gear R4 in the open state.

The brake B1 connects the casing 12 with the sun gear S1 of the planetary gear mechanism P1 in the engagement state, and releases the connection between the casing 12 and the sun gear S1 in the open state. Further, the brake B2 connects the casing 12 with the sun gear S4 of the planetary gear mechanism P4 in the engagement state, and releases the connection between the casing 12 and the sun gear S4 in the open state. Then, the brake B3 connects the casing 12 with the ring gear R4 of the planetary gear mechanism P4 in the engagement state, and releases the connection between the casing 12 and the ring gear R4 in the open state.

As described above, the brake F1 restricts only the unidirectional rotation of the carrier Cr2 of the planetary gear mechanism P2 (and the carrier Cr1 connected thereto) when it is in the "unidirectional rotation allowed state," and when it is in the "bidirectional rotation blocked state," the carrier Cr2 of the planetary gear mechanism P2 (and the carrier Cr1 connected thereto) is fixed to the casing 12.

<Operation of Automatic Transmission>

Here, the operation of the automatic transmission 1 according to the embodiment will be described below with reference to FIGS. 2 to 4.

FIG. 2 is an engagement table of the engagement mechanisms C1 to C3, B1 to B3 and F1 of the automatic transmission 1. FIG. 3 is a diagram showing the gear ratios of the planetary gear mechanisms P1 to P4 of the automatic transmission 1. FIG. 4 is a collinear diagram (speed diagram) of the automatic transmission 1. Further, the "gear ratio" shown in FIG. 2 indicates the gear ratio between the input shaft 10 and the output member 11.

In the automatic transmission 1 according to the embodiment, it is possible to establish ten forward stages (1st to 10th) and one reverse stage (RVS). In addition, "P/N" in FIG. 2 indicates a non-traveling range, and "P" indicates a parking range, and "N" indicates a neutral range. Further, "RPM" indicates a combination of engagement of the clutches C1 to C3, the brakes B1 to B3, and the brake F1 in a reverse preparation process (hereinafter referred to as the "RVS preparation process") described later, and in this RVS preparation process, the brake F1 is switched from the "unidirectional rotation allowed state (OWC)" to the "bidirectional rotation blocked state (TWC)."

In the operation table shown in FIG. 2, "○" indicates an engagement state, and no mark indicates an open state. Although it is not necessary for the shift stages, the operation table includes engagement mechanisms which are in an engagement state (indicated by "○") in order to smoothly shift to the adjacent front and rear shift stages. For example, in the case of the first speed stage (1st), the engagement of the brake B2 is not necessary, but the engagement state is set for the purpose of reducing the number of engagement mechanisms for switching the engagement state when it is shifted to the reverse stage (RVS) or the second speed stage (2nd). Similarly, in the case of the fifth speed stage (5th), the engagement of the clutch C3 is not necessary, but the engagement state is set for the purpose of reducing the number of engagement mechanisms for switching the engagement state when it is shifted to the fourth speed stage (4th) or the sixth speed stage (6th).

Regarding the brake F1, "○" indicates that it is the bidirectional rotation blocked state, and "Δ" indicates that it is the unidirectional rotation allowed state. In the case of the first speed stage (1st), the brake F1 may be in either the bidirectional rotation blocked state or the unidirectional rotation allowed state; in the bidirectional rotation blocked state, the engine brake works; and in the unidirectional rotation allowed state, the engine brake does not work. The algorithm for which state the brake F1 is set to in the case of the first speed stage (1st) can be appropriately designed, but for example, the state before the shift to the first speed stage (1st) may be continued. Specifically, when shifting from the reverse stage (RVS) to the first speed stage (1st), the first speed stage (1st) remains in the bidirectional rotation blocked state. However, it may be switched to the unidirectional rotation allowed state in the case where the vehicle speed becomes greater than the predetermined speed or the like. Similarly, when shifting from the other forward stages (2nd to 10th) to the first speed stage (1st), the first speed stage (1st) remains in the unidirectional rotation allowed state.

In the non-traveling range (P/N) as well, the state of the brake F1 may be either the bidirectional rotation blocked state or the unidirectional rotation allowed state. Therefore, as in the case of the first speed stage (1st), the state before shifting to the non-traveling range (P/N) may be continued.

In the second speed stage (2nd) to the tenth speed stage (10th), the brake F1 is in the unidirectional rotation allowed state, but is in an idling state due to the configuration of the automatic transmission 1. Therefore, in the operation table shown in FIG. 2, the state of the brake F1 is indicated as "(Δ)." If the brake F1 can select the bidirectional rotation allowed state, it is also possible to set the brake F1 in the bidirectional rotation allowed state in the second speed stage (2nd) to the tenth speed stage (10th).

Further, in the embodiment, in each of the second speed stage (2nd) to the tenth speed stage (10th), the unidirectional rotation allowed state is selected as the state of the brake F1, but depending on the configuration of the automatic transmission 1, a configuration in which the bidirectional rotation blocked state is selected can also be adopted.

Figure 4:
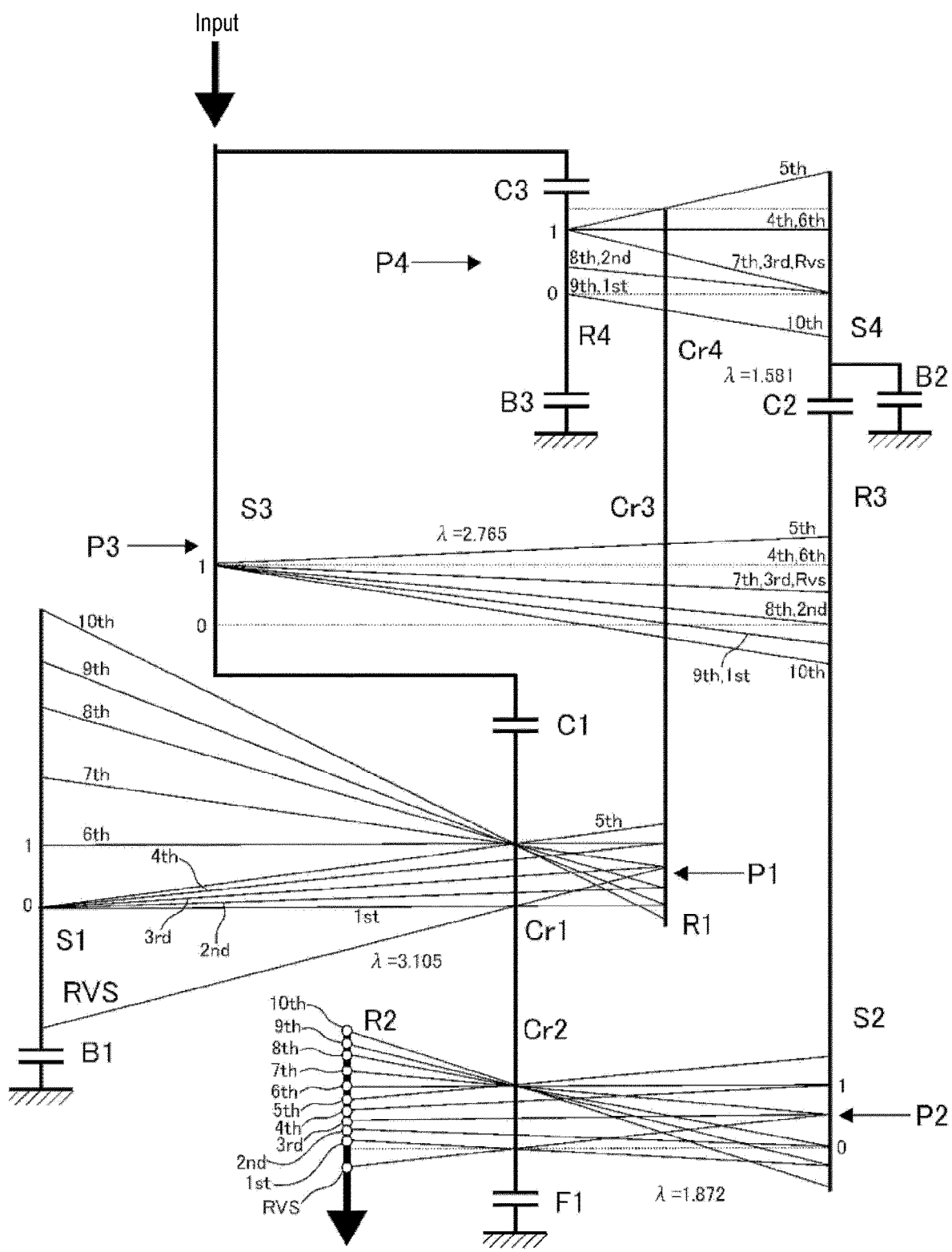
FIG. 4 is a collinear diagram (speed diagram) of the automatic transmission for vehicle.

The speed diagram (collinear diagram) shown in FIG. 4 shows the rotation speed ratio of each element with respect to the input to the input shaft 10 at each shift stage. The vertical axis of FIG. 4 indicates the speed ratio, and the speed ratio "1" indicates that the speed is the same as that of the input shaft 10, and the speed ratio "0" indicates the stopped state. Further, the horizontal axis indicates the gear ratio between the rotation elements of the planetary gear mechanisms P1 to P4, and "2" in the figure indicates the gear ratio between the carrier Cr and the sun gear S. In addition, in FIG. 4, the elements corresponding to the output shaft 13 are not shown.

[Control Device of Automatic Transmission]

Next, a control device of the automatic transmission 1 according to the disclosure will be described.

<Basic Configuration of Control Device>

Figure 5:
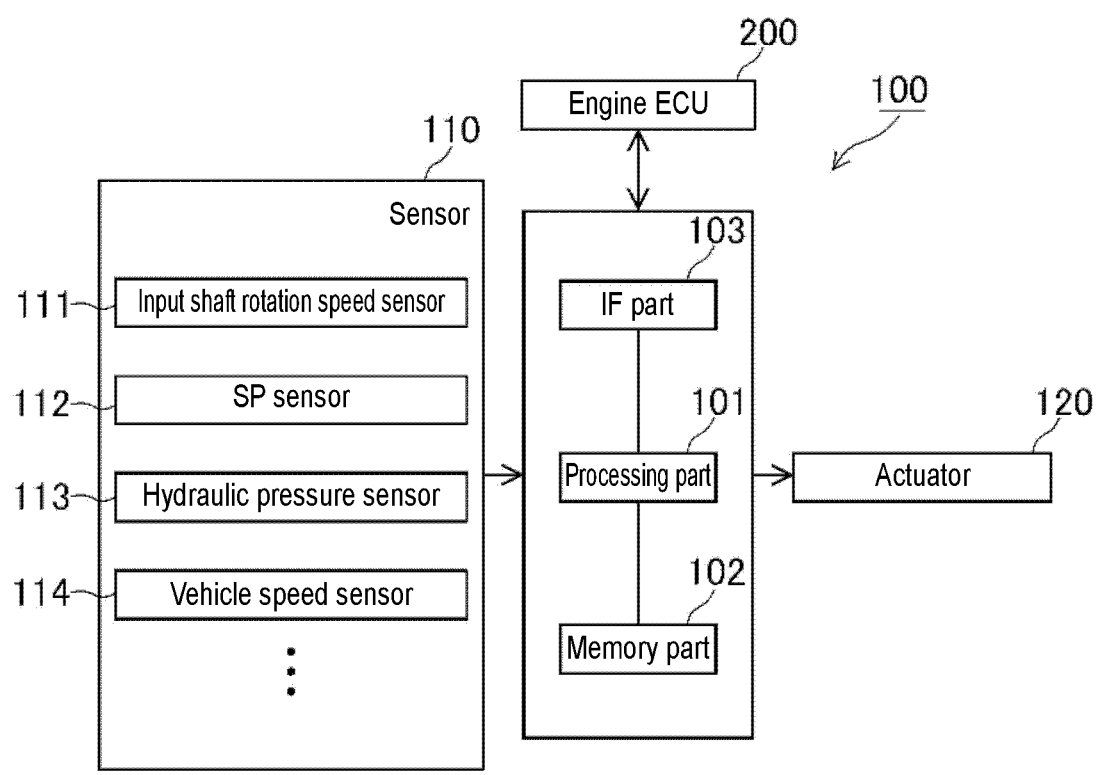
FIG. 5 is a block diagram showing a configuration of a control device according to the disclosure.

FIG. 5 is a block diagram showing a basic configuration of a control device 100 of the automatic transmission 1, and the shown control device 100 can control not only the automatic transmission 1 but also the engine EG and the torque converter TC (see FIG. 1). In the embodiment, the engine EG adopts a configuration in which it is controlled by an engine ECU 200 provided separately from the control device 100. In this case, the control device 100 can receive various information on the engine EG and the vehicle from the engine ECU 200, and can transmit the information on the automatic transmission 1 to the engine ECU 200.

The control device 100 includes a processing part 101 such as a CPU; a memory part 102 including a RAM, a ROM, and the like; and an IF part 103 which interfaces an external device, the engine ECU 200, and the processing part 101. Here, the IF part 103 is configured by, for example, a communication interface, an input/output interface, or the like.

The processing part 101 executes various programs stored in the memory part 102, and drives and controls various actuators 120 based on the detection results of various sensors 110.

Further, the various sensors 110 include various sensors provided in the automatic transmission 1, and examples of the various sensors include an input shaft rotation speed sensor 111, a shift position sensor (SP sensor) 112, a hydraulic pressure sensor 113, a vehicle speed sensor 114, and the like.

The input shaft rotation speed sensor 111 is a sensor which detects the rotation speed of the input shaft 10 (see FIG. 1), and the SP sensor 112 is a sensor which detects a shift position selected by the driver. Here, four types of ranges are set as the shift positions: P range (parking range), D range (forward range), N range (neutral range), and R range (reverse range). When the D range is selected by the driver, the processing part 101 selects one of the first speed stage (1st) to the tenth speed stage (10th) according to the vehicle speed map stored in the memory part 102 to perform the shift. When the R range is selected, the processing part 101 selects the reverse stage (RVS).

The hydraulic pressure sensor 113 detects the hydraulic pressure of each hydraulic oil supplied to the clutches C1 to C3 and the brakes B1 to B3, and the vehicle speed sensor 114 detects the traveling speed (vehicle speed) of the vehicle equipped with the automatic transmission 1.

The various actuators 120 driven and controlled by the processing part 101 include electromagnetic actuators such as electromagnetic solenoids which switch the operation state of the clutches C1 to C3, the brakes B1 to B3, and the brake F1 provided in the automatic transmission 1.

Figures 6, 7:
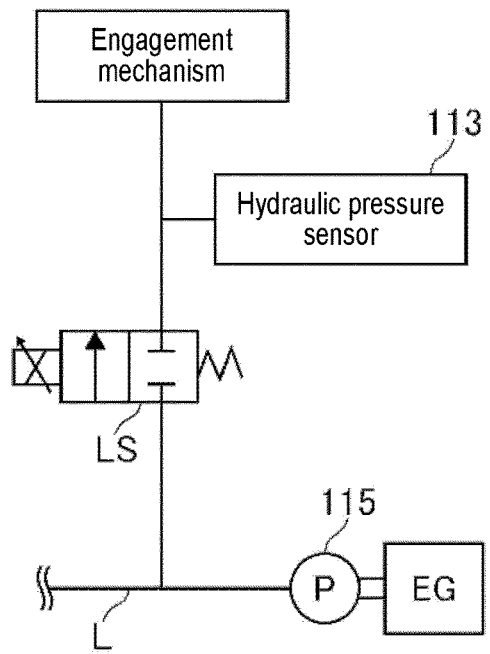
FIG. 6 is a diagram showing a configuration example of the hydraulic pressure sensor.
FIG. 7 is a diagram showing an engaging operation of each engagement mechanism at the time of reverse selection in the control device according to the disclosure.

Here, although a disposition example of the hydraulic pressure sensor 113 is shown in FIG. 6, the hydraulic pressure sensor 113 can be provided for each of the clutches C1 to C3, the brakes B1 to B3, and the brake F1. In this way, the hydraulic pressure of the hydraulic oil supplied to the clutches C1 to C3, the brakes B1 to B3, and the brake F1 can be detected respectively. Further, the hydraulic pressure sensor 113 is not required to be provided for each of the clutches C1 to C3 and the brakes B1 to B3.

In addition, as shown in FIG. 6, an electromagnetic valve LS and the hydraulic pressure sensor 113 are provided on a hydraulic oil supply line L from an oil pump 115 driven by the engine EG to the engagement mechanisms (the clutches C1 to C3 and the brakes B1 to B3). Here, the electromagnetic valve LS functions to switch between engagement and release of the engagement mechanisms (the clutches C1 to C3 and the brakes B1 to B3) by opening or blocking the hydraulic oil supply line L.

<Switching Control of Brake F1>

In the automatic transmission 1 according to the embodiment, when the reverse stage (RVS) is selected, the brake F1 is in the rotation blocked state. When switching from the forward stage (D range) or non-traveling range (P/N range) to the reverse stage (RVS), in some cases, the brake F1 may be switched from the unidirectional rotation allowed state (OWC) to the bidirectional rotation blocked state (TWC). At this time, in order to suppress the generation of abnormal noise and vibration, it is desirable that the differential rotation between the casing 12 side and the carrier Cr2 side of the brake F1 is 0. That is, it is desirable that the rotation speed of the carrier Cr2 is 0.

Therefore, it is necessary to go through a combination of engagement mechanisms in which the rotation speed of the carrier Cr2 becomes 0. In the embodiment, since the sensor that directly measures the rotation speed of the carrier Cr2 is not provided, by putting the carrier Cr2 and the input shaft 10 in the connection state, it is confirmed that the rotation speed of the carrier Cr2 is 0 from the detection result of the input shaft rotation speed sensor 111 (see FIG. 5) and the like. Then, after that, the brake F1 is switched to the bidirectional rotation blocked state (locked state).

FIG. 7 is a diagram showing an engagement combination of the engagement mechanisms (the clutches C1 to C3 and the brakes B1 to B3 and F1) when switching the shift stage from the forward first speed stage (1st) to the forward tenth speed stage (10th) and the reverse stage (RVS). Here, when the shift stage is in the forward first speed stage (1st), the brakes B1 and B2 are in the engagement state (indicated by "○" in FIG. 7) as shown in FIG. 2. At this time, it is assumed that the brake F1 is in the unidirectional rotation allowed state (indicated by "Δ" in FIG. 7).

First, as shown in Stage 1 of FIG. 7, the brakes B1 and B2 are controlled to be in the open state (indicated by "↓"). When the brakes B1 and B2 start to be opened, the process then proceeds to Stage 2.

In Stage 2, the clutches C1 and C3 and the brake B3 are engaged. At this time, since the ring gear R2 and the output shaft 13 are rotatable, the driving wheels (not shown) can also rotate freely. Therefore, it is possible to prevent the occurrence of a situation in which the vehicle behaves unexpectedly.

As is clear from the speed diagram (collinear diagram) shown in FIG. 4, the input shaft 10 is fixed to the casing 12 by engaging the clutch C3 and the brake B3. Further, by engaging the clutch C1, the carrier Cr2 is connected to the input shaft 10. In addition, Stage 1 and Stage 2 can be performed in parallel. Specifically, while the brakes B1 and B2 are controlled to be in the open state, the clutches C1 and C3 and the brake B3 are controlled to be engaged. By doing so, it is possible to improve the responsiveness to switching the shift stage to the reverse stage (RVS).

By going through the above-mentioned Stages 1 and 2, the RVS preparation process for engaging the clutches C1 and C3 and the brake B3 to stop the rotation of the input shaft 10 is executed. After the RVS preparation process is executed, when a predetermined condition is satisfied, the process proceeds to the next Stage 3. Here, the predetermined condition is a condition that it is confirmed that the rotation speed of the carrier Cr2 is 0 or a small value close to 0. Specifically, the completion of engagement of the clutch C1 and the detection result of the input shaft rotation speed sensor 111<a predetermined value (for example, a value that can be regarded as 0) are satisfied. The completion of engagement of the clutch C1 is determined, for example, by the detection result of the hydraulic pressure sensor 113 for the clutch C1 showing a predetermined value, the control amount for the electromagnetic valve LS for the clutch C1 reaching a specified value, and the like. The completion of engagement of other engagement mechanisms can also be determined by the same determination method.

In Stage 3, the brake F1 is switched from the unidirectional rotation allowed state to the bidirectional rotation blocked state (locked state). At this time, since the differential rotation between the casing 12 side and the carrier Cr2 side of the brake F1 is a value of 0 or close to 0, it is possible to prevent the generation of abnormal noise and vibration. Then, when the switching of the brake F1 is completed, the process proceeds to Stage 4. In Stage 4, the clutch C1 and the brake B3 are released, and the brake B2 is engaged.

By going through the above Stages 3 and 4, the brake F1 is switched to the bidirectional rotation blocked state (locked state), and a process for switching the shift stage to the reverse stage (RVS) (hereinafter referred to as "RVS in-gear process") is executed, and the vehicle starts to travel backward.

<Switching Control to Reverse Stage>

Next, the switching control to the reverse stage (RVS) by the control device 100 according to the disclosure will be described.

The control device 100 has a function of being capable of engaging the clutches C1 and C3 and the brake B3, which are predetermined engagement mechanisms when the shift stage is the first speed stage (1st), which is the lowest forward shift stage, and the brake F1 is in the unidirectional rotation allowed state (first state).

Further, the control device 100 has a function of being capable of switching the brake F1 to the unidirectional rotation allowed state (first state) when the shift stage is the first speed stage (1st), and the brake F1 is in the bidirectional rotation blocked state (second state), and the clutches C1 and C3 and the brake B3, which are the predetermined engagement mechanisms, are engaged.

The control device 100 having the above-mentioned functions immediately starts the RVS preparation process when the reverse stage (RVS) is selected as the shift stage when the brake F1 is in the unidirectional rotation allowed state (first state), and the vehicle is traveling at a vehicle speed greater than or equal to the highest vehicle speed at which the reverse stage (RVS) can be established. Specifically, hydraulic pressure is supplied to the clutches C1 and C3 and the brake B3, which are the predetermined engagement mechanisms, to start their engagements and stop the rotation of the input shaft 10. Specifically, the SP sensor 112 detects the neutral (N) as the shift position, and at the same time, hydraulic pressure starts being supplied to the clutches C1 and C3 and the brake B3 to execute the RVS preparation process.

Further, in the control device 100, when the reverse stage (RVS) is selected as the shift stage, the RVS in-gear process for switching the shift stage to the reverse stage (RVS) is executed when the rotation speed of the input shaft 10 detected by the input shaft rotation speed sensor 111 is less than the specified value and the vehicle speed detected by the vehicle speed sensor 114 is less than the specified value after the RVS preparation process is executed. Here, the specified value of the rotation speed of the input shaft 10 is 0 or a small value close to 0, and the specified value of the vehicle speed is the vehicle speed at which the first speed stage (1st) is selected as the shift stage if the shift position is switched to the drive range (D).

Here, the control procedures by the control device 100 according to the disclosure will be specifically described below with reference to FIGS. 8 to 13.

Figure 8:
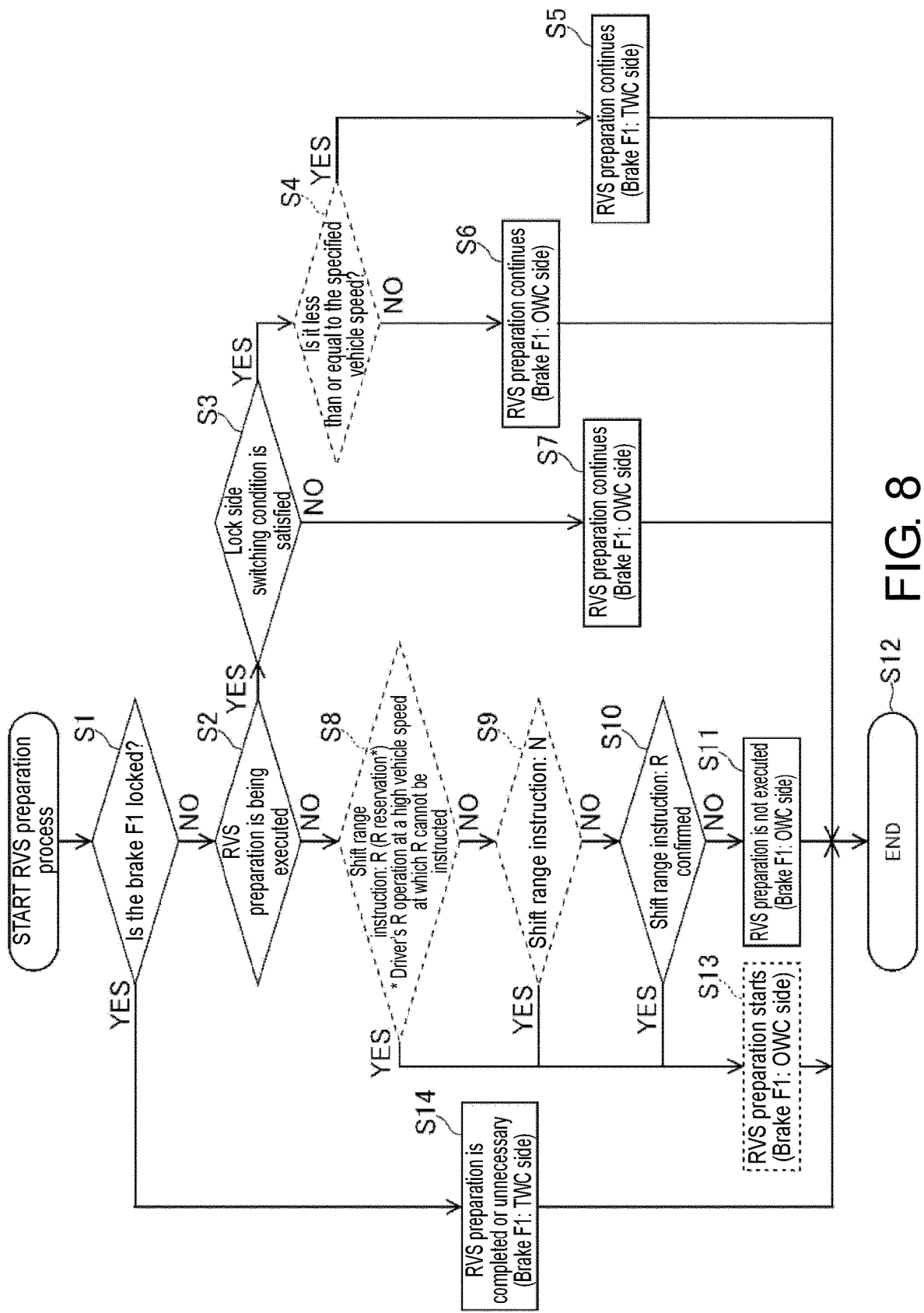
FIG. 8 is a flowchart showing a processing procedure of the control device according to the disclosure.
Figure 9:
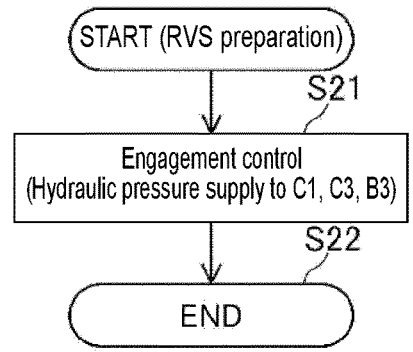
FIG. 9 is a flowchart showing a procedure for determining whether the reverse preparation is being executed among the processing procedure shown in FIG. 8.
Figure 10:
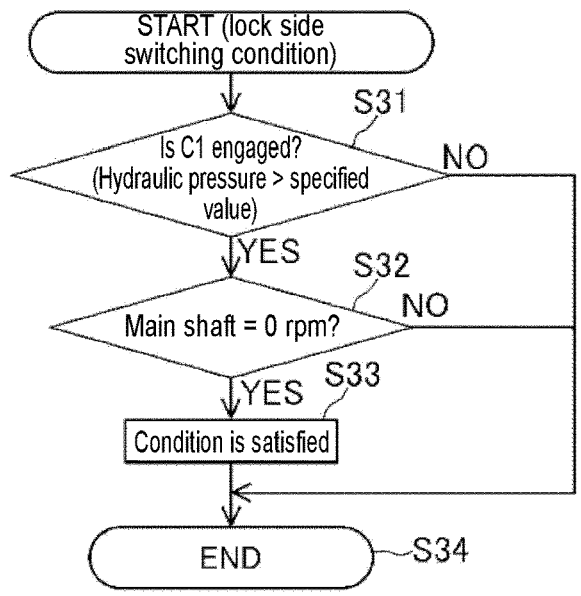
FIG. 10 is a flowchart showing a procedure for determining whether the lock side switching condition of the mechanical engagement mechanism is satisfied among the processing procedure shown in FIG. 8.
Figure 11:
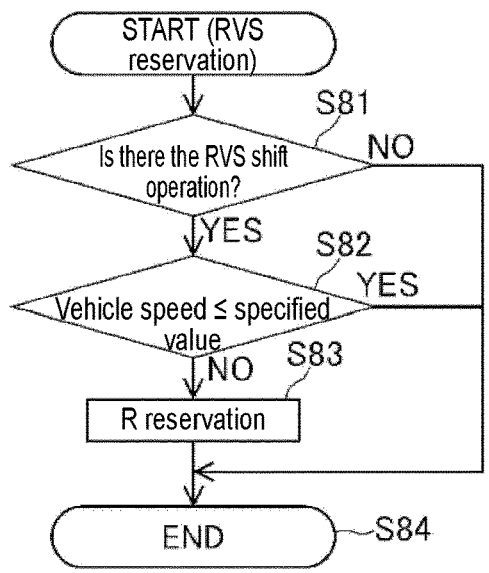
FIG. 11 is a flowchart showing a procedure for determining the reverse reservation among the processing procedure shown in FIG. 8.
Figure 12:
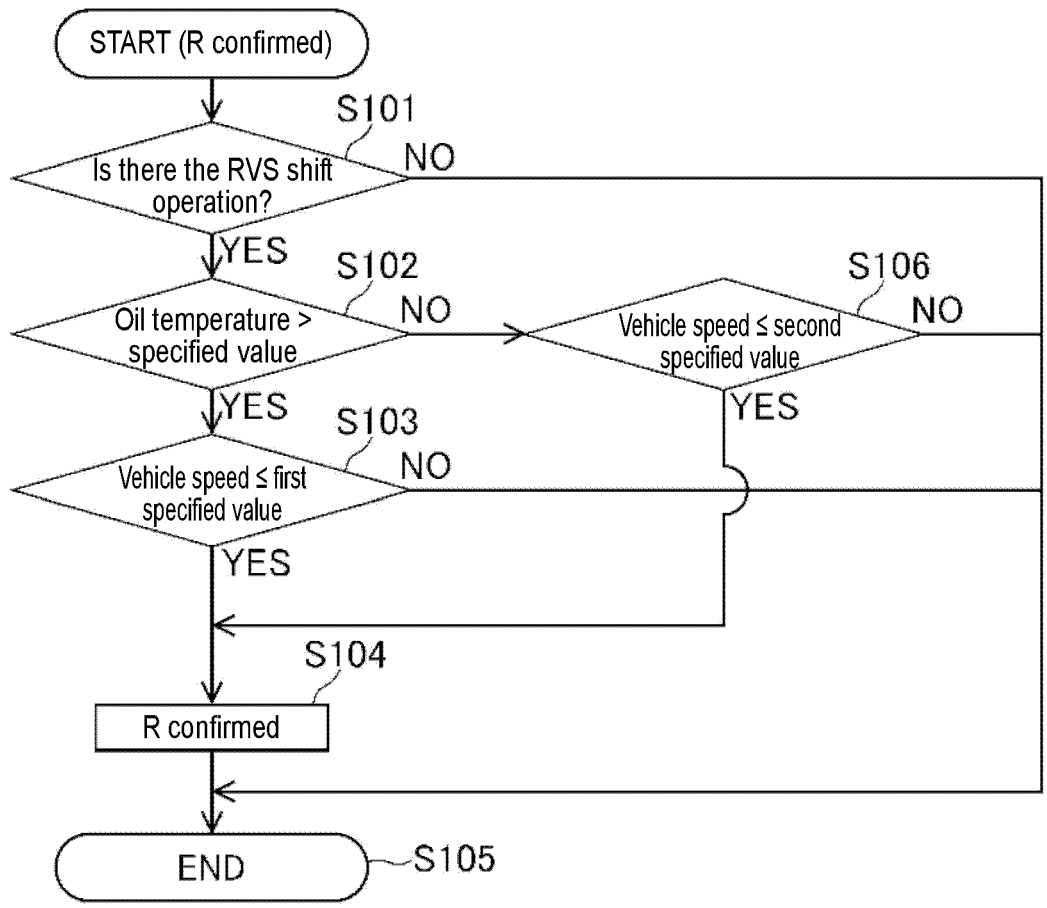
FIG. 12 is a flowchart showing a procedure for determining the reverse confirmation among the processing procedure shown in FIG. 8.
Figure 13:
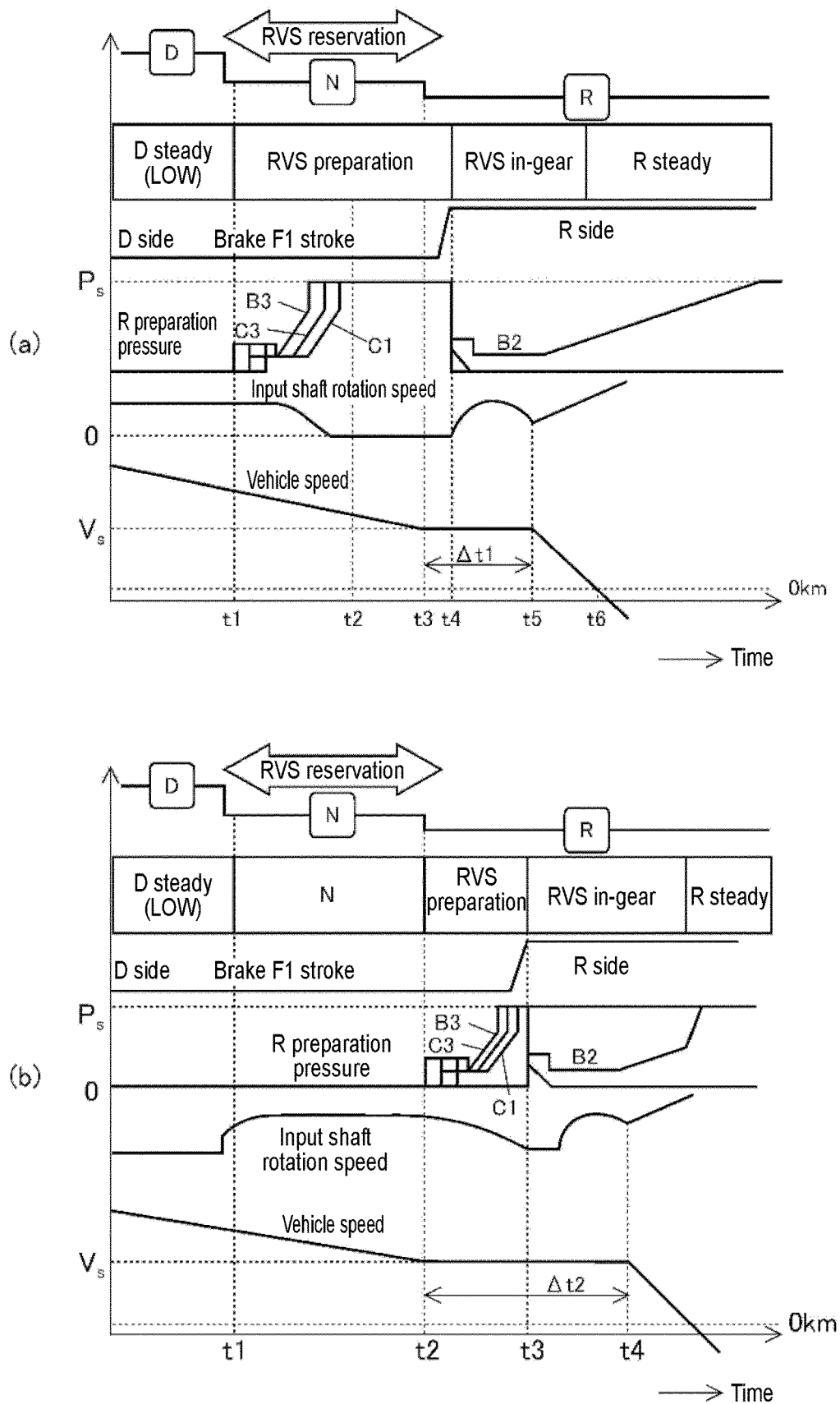
In FIG. 13, (a) is a timing chart showing a processing procedure of the control device according to the disclosure, and (b) is a timing chart showing a processing procedure of a conventional control device.

FIG. 8 is a flowchart showing a processing procedure of the control device according to the disclosure. FIG. 9 is a flowchart showing a procedure for determining whether the reverse preparation is being executed among the processing procedure shown in FIG. 8. FIG. 10 is a flowchart showing a procedure for determining whether the lock side switching condition of the mechanical engagement mechanism is satisfied among the processing procedure shown in FIG. 8. FIG. 11 is a flowchart showing a procedure for determining the reverse reservation among the processing procedure shown in FIG. 8. FIG. 12 is a flowchart showing a procedure for determining the reverse confirmation among the processing procedure shown in FIG. 8. In FIG. 13, (a) is a timing chart showing a processing procedure of the control device according to the disclosure, and (b) is a timing chart showing a processing procedure of a conventional control device.

While the vehicle is traveling forward, the driver operates a dial shifter (not shown) to switch the shift position from the drive (D) to the reverse (R), and at the same time, the control device 100 executes the RVS preparation process as described above. In addition, in reality, when the reverse (R) is selected as the shift position, as shown in FIG. 13, the shift position always passes through the neutral (N) before being switched to the reverse (R); however, while passing through this neutral (N) and while the driver selects "R" by operating the shifter, since the vehicle speed is high, it is a state defined as the "RVS reservation" in which the processing part does not accept "R" but sets the control instruction to "N" as the control process and automatically sets it to "R" when the vehicle speed decreases. That is, as shown in (a) of FIG. 13, when the shift position is switched to the reverse (R) by the operation of the dial shifter by the driver at the time t1, the RVS preparation process is executed at the same time as the RVS reservation is made.

When the RVS preparation process is executed, it is determined whether the brake F1 is in the locked state (second state: bidirectional rotation blocked state) (Step S1 in FIG. 8). For the result of the determination, when the brake F1 is not in the locked state (Step S1: No), it is determined whether the RVS preparation process is being executed (Step S2). The details of this determination are shown in FIG. 9. When the RVS preparation process is executed, hydraulic pressure is supplied to the clutches C1 and C3 and the brake B3 to control their engagements (Step S21 in FIG. 9), and the process ends (Step S22).

As described above, when hydraulic pressure is supplied to the clutches C1 and C3 and the brake B3 and their engagements are started, the input shaft 10 is fixed to the casing 12 side, and the rotation of the input shaft 10 gradually decreases, as shown in (a) of FIG. 13. Further, since the carriers Cr1 and Cr2 connected to the rotation side of the brake F1 are connected to the input shaft 10, the rotation of these carriers Cr1 and Cr2 gradually decreases together with the input shaft 10. As a result, in the brake F1 having a function as a two-way clutch, the differential rotation between the fixed side (the casing 12 side) and the rotation side (the clutches Cr1 and Cr2 side) gradually becomes smaller.

In addition, in the embodiment, as shown in (a) of FIG. 13, the supply of hydraulic pressure to the clutches C1 and C3 and the brake B3 is not started at the same time but is performed with a time difference. Specifically, first, the brake B3, then the clutch C3, and finally the clutch C1 are supplied with hydraulic pressure with a predetermined time difference from each other. By doing so, since the brake B3 and the clutches C3 and C1 are engaged with a time difference, the impact at the time of their engagements is kept small, and the generation of abnormal noise and vibration is also suppressed.

Then, when the RVS preparation process is being executed (Step S2: Yes), it is determined whether the lock side switching condition of the brake F1 is satisfied (Step S3). The details of this determination are shown in FIG. 10. In this determination, it is determined whether the engagement of the clutch C1 is completed (Step S31 in FIG. 10). This determination is made based on whether the hydraulic pressure supplied to the clutch C1 detected by the hydraulic pressure sensor 113 (see FIG. 5) exceeds a specified value $P_S$.

For the result of the above determination, when the engagement of the clutch C1 is completed (Step S31: Yes), it is determined whether the rotation speed of the input shaft 10 detected by the input shaft rotation speed sensor 111 (see FIG. 5) is 0 rpm (whether the rotation of the input shaft 10 is stopped); and when the rotation speed of the input shaft 10 is 0 rpm (Step S32: Yes), it is determined that the lock side switching condition of the brake F1 is satisfied (Step S33), and the process ends (Step S34). In the embodiment, one of the requirements for satisfying the lock side switching condition of the brake F1 is that the rotation speed of the input shaft 10 is 0 rpm, but it may be a requirement that the rotation speed of the input shaft 10 is a small value close to 0 rpm.

On the other hand, when the engagement of the clutch C1 is not completed (Step S31: No), or when the rotation speed of the input shaft 10 is not 0 rpm and the input shaft 10 is rotating (Step S32: No), it is determined that the lock side switching condition of the brake F1 is not satisfied, and the process ends (Step S34).

Here, with reference back to the description of the process shown in FIG. 8, when the lock side switching condition of the brake F1 is satisfied (Step S3: Yes), it is determined whether the vehicle speed detected by the vehicle speed sensor 114 (see FIG. 5) is less than or equal to a specified value $V_S$ (see (a) of FIG. 13) (Step S4). Here, the specified value $V_S$ of the vehicle speed is a vehicle speed at which the first speed stage (1st) is selected as the shift stage if the shift position is switched to the drive (D), and is set to 6 km/h in this embodiment. For the result of the determination, when the vehicle speed is less than or equal to the specified value $V_S$ (Step S4: Yes), the RVS preparation process is continued, and the brake F1 is switched to the lock side (Step S5).

On the other hand, when the lock side switching condition of the brake F1 is not satisfied (Step S3: No), or when the lock side switching condition of the brake F1 is satisfied (Step S3: Yes) but the vehicle speed exceeds the specified value Vs (Step S4: No), the RVS preparation process is continued, and the brake F1 is not switched to the lock side, and the unidirectional rotation allowed state (OWC state) is maintained (Steps S6 and S7).

That is, as shown in (a) of FIG. 13, at the time t2, even if the engagement of the clutch C1 is completed and the rotation of the input shaft 10 is 0 rpm (rotation stop of the input shaft 10), when the vehicle speed exceeds the specified value $V_S$, the brake F1 is not switched to the lock side, and the brake F1 is not switched to the lock side until the vehicle speed decreases to the specified value $V_S$. Then, during this time, the brake F1 is maintained in the unidirectional rotation allowed state (OWC state). Therefore, even when the driver performs an operation to set the shift position to the drive (D) in this state, it is not necessary to switch the brake F1 to the unidirectional rotation allowed state (OWC state), and the shift stage can be easily set to the second speed stage (2nd) or higher.

That is, as is clear from the engagement table shown in FIG. 2, if the brake F1 is switched to the lock side (TWC side), the forward shift stage (2nd to 10th) of the second speed stage (2nd) or higher cannot be established, and the shift stage is always the first speed stage (1st). Therefore, if the brake F1 is switched to the lock side (TWC side) at a high vehicle speed, when the driver shifts the shift position to the drive (D), the shift stage is always the first speed stage (1st), and the engine brake works and the vehicle decelerates suddenly, which makes the driver uncomfortable.

Here, as shown in (a) of FIG. 13, at the time t2, after the engagement of the clutch C1 is completed and the rotation of the input shaft 10 becomes 0 rpm (rotation stop), the vehicle speed decreases to less than or equal to the specified value $V_S$ at the time t3. Then, the reverse is confirmed (R confirmed), and the hydraulic pressure supply to the brake B2 is started at the time t4 when the RVS preparation process is completed, and the RVS in-gear process is performed to switch the shift stage to the reverse stage (RVS) at the time t5. Therefore, a driving force is applied to the vehicle in the reverse direction, and the vehicle starts to travel backward from the time t6.

When the brake F1 is not in the locked state (Step S1: No) and the RVS preparation process is not performed because the RVS preparation process is completed (Step S2: No), it is determined whether the driver has instructed the shift range to the reverse stage (RVS). Here, the details of this determination are shown in FIG. 11. In this determination, it is determined whether the driver has performed a shift operation (RVS shift) to the reverse (R) (Step S81 in FIG. 11). Then, when there is a shift operation by the driver (Step S81: Yes), it is determined whether the vehicle speed is less than or equal to the specified value $V_S$ (see (a) of FIG. 13) (Step S82). When the vehicle speed is greater than the specified value $V_S$ (Step S82: No), the RVS reservation (see (a) of FIG. 13) is made (Step S83), and the determination process ends (Step S84).

On the other hand, when there is not the RVS shift operation by the driver (Step S81: No), or even if there is the RVS shift operation (Step S81: Yes) but the vehicle speed is less than or equal to the specified value $V_S$ (Step S82: Yes), the RVS reservation is not made, and the process ends (Step S84).

With reference back to the description of the process shown in FIG. 8 again, if there is no instruction for RVS shift by the driver (Step S8: No), it is determined whether there is a shift instruction to the neutral (N) (Step S9). Then, when the RVS reservation cannot be made in Step S8 (Step S8: No), and there is no shift instruction to the neutral (N) (Step S9: No), it is determined again whether there is the shift operation to the reverse stage (RVS) by the driver in order to confirm the RVS (Step S10). Here, the details of this determination will be described below with reference to FIG. 12.

That is, first, it is determined whether there is the shift operation to the reverse stage (RVS) by the driver (Step S101 in FIG. 12), and then when there is the shift operation to the reverse stage (RVS) (Step S101: Yes), it is determined whether the oil temperature exceeds a specified value (Step S102). For the result of the determination, when the oil temperature exceeds the specified value (Step S102: Yes), it is determined whether the vehicle speed is less than or equal to a first specified value (for example, 6 km/h) (Step S103). Then, when the vehicle speed at this time is less than or equal to the first specified value (Step S103: Yes), the RVS is confirmed (Step S104), and the process ends (Step S105).

On the other hand, when there is not the shift operation to the reverse stage (RVS) by the driver (Step S101: No), or the oil temperature is less than the specified value (Step S102: No), it is determined whether the vehicle speed is less than or equal to a second specified value (Step S106). Here, the second specified value of the vehicle speed is a value less than the first specified value, and a magnitude relationship of the first specified value>the second specified value is established between the two.

Even if there is the shift operation to the reverse stage (RVS) by the driver (Step S101: Yes), but the oil temperature is less than the specified value (Step S102: No), when the vehicle speed at this time is less than or equal to the second specified value (Step S106: Yes), the RVS is confirmed (Step S104), and the process ends (Step S105). On the other hand, when the vehicle speed exceeds the second specified value (Step S106: No), the process ends (Step S105).

Here, with reference back to the description of the process shown in FIG. 8, when it is determined in Step S10 that the RVS is not confirmed (Step S10: No), the RVS preparation process is not executed, and the brake F1 is maintained in the unidirectional rotation allowed state (OWC state) (Step S11), and a series of processing ends (Step S12).

On the other hand, when the brake F1 is not in the locked state (Step S1: No) and the RVS preparation process is not being executed (Step S2: No), when it becomes the R reservation state in which when there is the shift operation to the reverse stage (RVS) by the driver but in reality the shift is set to the neutral because it is at a vehicle speed at which RVS cannot be accepted and in which the vehicle is automatically placed in the RVS when the vehicle speed decreases (Step S8: Yes), or when there is not the shift operation to the reverse stage (RVS) by the driver (Step S8: No), when there is the shift instruction to the neutral (N) at a low vehicle speed at which RVS is accepted (assuming that the shift position moves from the D to the RVS via the N range) (Step S9: Yes), or even when there is not the shift instruction to the neutral (N) (Step S9: No), when the RVS operation is performed at a low vehicle speed at which the RVS is accepted (Step S10: Yes), the RVS preparation process is started (Step S13). Further, at the stage when the RVS preparation process is started in this way, the brake F1 is in the unidirectional rotation allowed state (OWC state).

In addition, when the brake F1 is in the locked state (TWC state) from the beginning (Step S1: Yes), the RSV preparation process is completed or the RVS preparation process is unnecessary (Step S14), so the process ends as it is. (Step S12).

Effect of the Embodiment

As described above, in the embodiment, even when the vehicle is traveling at a high speed, when the reverse stage (RVS) is selected by the driver, the RVS preparation process for starting the engagements of the clutches C1 and C3 the brake B3, which are the predetermined engagement mechanisms, and stopping the rotation of the input shaft 10 is immediately executed. Therefore, it is not necessary to wait without executing the RVS preparation process until the vehicle speed decreases to the specified value (for example, 6 km/h) as in the conventional technique, and the responsiveness to switching to the reverse stage (RVS) of the automatic transmission 1 can be improved.

Specifically, conventionally, the RVS preparation process is performed when the vehicle speed decreases to the specified value. Therefore, as shown in (b) of FIG. 13, it took the time Δt2 shown in the figure from the RVS confirmation to the RVS in-gear process. However, in the embodiment, as shown in (a) of FIG. 13, the time required from the RVS confirmation to the RVS in-gear process can be shortened to Δt1 (<Δt2) shown in the figure.

Further, even if the RVS preparation process is completed, when the vehicle speed exceeds the specified value $V_S$, the brake F1 is not switched to the lock side, and the brake F1 is not switched to the lock side until the vehicle speed decreases to the specified value $V_S$. Then, during this time, the brake F1 is maintained in the unidirectional rotation allowed state (OWC state). Therefore, even when the driver performs an operation to set the shift position to the drive (D) in this state, it is not necessary to switch the brake F1 to the unidirectional rotation allowed state (OWC state), and the shift stage can be easily set to the second speed stage (2nd) or higher.

In addition, if the brake F1 is switched to the second state (lock side), the forward shift stage of the second speed stage (2nd) or higher cannot be established, and the shift stage is always the first speed stage (1st). Therefore, if the brake F1 is switched to the lock side (TWC side) at a high vehicle speed, when the driver shifts the shift position to the drive (D), the shift stage is always the first speed stage (1st), and the engine brake works and the vehicle decelerates suddenly, which makes the driver uncomfortable; however, in the embodiment, such a problem does not occur.

Further, the disclosure is not limited to the embodiments described above, and various modifications can be made within the scope of claims and the technical ideas described in the specification and drawings.

What is claimed is:

1. A control device of an automatic transmission for vehicle, the automatic transmission for vehicle comprising:
   an input shaft to which a driving force is input;
   an output member which outputs a driving force;
   a plurality of planetary gear mechanisms which transmit the driving force input to the input shaft to the output member; and
   a plurality of engagement mechanisms capable of establishing a plurality of shift stages by switching a transmission path of the driving force in the plurality of planetary gear mechanisms,
   wherein one of the plurality of engagement mechanisms is a mechanical engagement mechanism which is switchable between:
      a first state in which only rotation of a predetermined rotation element in a first direction among a plurality of rotation elements included in the plurality of planetary gear mechanisms is restricted; and
      a second state in which bidirectional rotation of the predetermined rotation element in the first direction and in a second direction opposite to the first direction is restricted,
   wherein the plurality of shift stages comprise:
   a lowest forward shift stage which is establishable when the mechanical engagement mechanism is in the first state or the second state;
   a forward shift stage which has a gear ratio greater than that of the lowest forward shift stage and which is not establishable when the mechanical engagement mechanism is in the second state; and
   a reverse stage which is establishable when the mechanical engagement mechanism is in the second state,
   wherein a predetermined engagement mechanism is an engagement mechanism which restricts the rotation of the predetermined rotation element in the second direction by engagement when the shift stage is the lowest forward shift stage and the mechanical engagement mechanism is in the first state, and
   wherein the control device comprises:
   a vehicle speed sensor which detects a vehicle speed; and
   a control part which controls the plurality of engagement mechanisms, wherein the control part
comprises a function of being capable of engaging the predetermined engagement mechanism when the shift stage is the lowest forward shift stage and the mechanical engagement mechanism is in the first state, and
executes a reverse preparation process for starting an engagement of the predetermined engagement mechanism and stopping rotation of the input shaft when the reverse stage is selected when the mechanical engagement mechanism is in the first state and the vehicle is traveling at a vehicle speed greater than a highest vehicle speed at which the reverse stage is establishable.

2. The control device of the automatic transmission for vehicle according to claim 1, further comprising:
a shift position detection part which detects a shift position,
wherein the control part executes the reverse preparation process when the shift position detection part detects neutral.

3. The control device of the automatic transmission for vehicle according to claim 2, wherein the predetermined engagement mechanism is a hydraulic engagement mechanism which engages by receiving a supply of hydraulic pressure, and
wherein the control part starts supplying hydraulic pressure to the predetermined engagement mechanism when the shift position detection part detects the neutral.

4. The control device of the automatic transmission for vehicle according to claim 1, further comprising:
a rotation speed detection part which detects a rotation speed of the input shaft,
wherein when the reverse stage is selected as the shift stage, the control part switches the shift stage to the reverse stage when the rotation speed of the input shaft detected by the rotation speed detection part is less than a specified value and the vehicle speed detected by the vehicle speed sensor is less than or equal to a specified value after the reverse preparation process is executed.

5. The control device of the automatic transmission for vehicle according to claim 2, further comprising:
a rotation speed detection part which detects a rotation speed of the input shaft,
wherein when the reverse stage is selected as the shift stage, the control part switches the shift stage to the reverse stage when the rotation speed of the input shaft detected by the rotation speed detection part is less than a specified value and the vehicle speed detected by the vehicle speed sensor is less than or equal to a specified value after the reverse preparation process is executed.

6. The control device of the automatic transmission for vehicle according to claim 3, further comprising:
a rotation speed detection part which detects a rotation speed of the input shaft,
wherein when the reverse stage is selected as the shift stage, the control part switches the shift stage to the reverse stage when the rotation speed of the input shaft detected by the rotation speed detection part is less than a specified value and the vehicle speed detected by the vehicle speed sensor is less than or equal to a specified value after the reverse preparation process is executed.

7. The control device of the automatic transmission for vehicle according to claim 4, wherein the specified value of the rotation speed of the input shaft is 0 or a small value close to 0, and
the specified value of the vehicle speed is a vehicle speed at which the lowest forward shift stage is selected as the shift stage if the shift position is switched to drive.

8. The control device of the automatic transmission for vehicle according to claim 5, wherein the specified value of the rotation speed of the input shaft is 0 or a small value close to 0, and
the specified value of the vehicle speed is a vehicle speed at which the lowest forward shift stage is selected as the shift stage if the shift position is switched to drive.

9. The control device of the automatic transmission for vehicle according to claim 6, wherein the specified value of the rotation speed of the input shaft is 0 or a small value close to 0, and
the specified value of the vehicle speed is a vehicle speed at which the lowest forward shift stage is selected as the shift stage if the shift position is switched to drive.

* * * * *